US012510045B2

(12) United States Patent
Snyder et al.

(10) Patent No.: US 12,510,045 B2
(45) Date of Patent: Dec. 30, 2025

(54) BIODIESEL CONVERSION KIT FOR AN FDL ENGINE

(71) Applicant: Transportation IP Holdings, LLC, Norwalk, CT (US)

(72) Inventors: Scott Snyder, Valencia, PA (US); Dennis Shea, Slippery Rock, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 151 days.

(21) Appl. No.: 18/426,218

(22) Filed: Jan. 29, 2024

(65) Prior Publication Data

US 2025/0243833 A1 Jul. 31, 2025

(51) Int. Cl.

*F02B 13/00* (2006.01)
*F02M 31/16* (2006.01)
*F02M 37/00* (2006.01)

(52) U.S. Cl.

CPC ........ *F02M 37/0064* (2013.01); *F02M 31/16* (2013.01); *F02M 37/0052* (2013.01)

(58) Field of Classification Search

CPC .. F02M 55/025; F02M 55/02; F02M 63/0225; F02M 55/005; F02M 61/14; F02M 61/168; F02M 37/0052; C10L 1/026; F02D 19/0694; F02D 19/0684

USPC .......................................................... 123/575

See application file for complete search history.

(56) References Cited

U.S. PATENT DOCUMENTS

| | | | | |
|---|---|---|---|---|
| 7,721,715 B2 * | 5/2010 | Sakagami | .............. | F02M 61/14 123/456 |
| 7,802,558 B2 * | 9/2010 | Panchal | ............... | F02M 55/025 123/456 |
| 8,402,946 B2 * | 3/2013 | Mehring | ............. | F02M 55/005 123/456 |
| 11,821,397 B2 * | 11/2023 | Richards | ............. | F02M 55/002 |
| 2015/0107558 A1 * | 4/2015 | Dugad | ................. | F02M 55/002 123/469 |
| 2020/0291911 A1 * | 9/2020 | Millet | ................ | F02M 63/0275 |
| 2023/0014983 A1 * | 1/2023 | McKinley | ............ | F02M 55/025 |

* cited by examiner

*Primary Examiner* — Logan M Kraft
*Assistant Examiner* — James J Kim
(74) *Attorney, Agent, or Firm* — K&L Gates LLP

(57) ABSTRACT

A biodiesel conversion kit is provided for a diesel engine. The biodiesel conversion kit may include a plurality of soft fuel lines with a Teflon inner sleeve, the plurality of soft fuel lines configured to couple a fuel reservoir to a series of unitized fuel injection assemblies. The biodiesel conversion kit may also include a first hard fuel line comprising a first bend angle configured to couple to a first soft fuel line of the plurality of soft fuel lines, a second hard fuel line comprising a second bend angle configured to couple to a second soft fuel line of the plurality of soft fuel lines, and a third hard fuel line comprising a third bend angle configured to couple to a third soft fuel line of the plurality of soft fuel lines.

20 Claims, 9 Drawing Sheets

BIODIESEL CONVERSION KIT FOR AN FDL ENGINE

BACKGROUND

Technical Field

Embodiments of the subject matter disclosed herein relate to systems and methods for biodiesel conversion for an FDL diesel engine.

Discussion of Art

Vehicle systems, such as locomotive rail vehicles, and ships, and stationary systems, such as electric power generators, may include power sources, such as diesel internal combustion engines. Stakeholders may wish to convert diesel engines to combust biodiesel fuel. To combust biodiesel fuel, the fuel is injected into the combustion chamber of the engine, where it is ignited by the heat of compression in a process similar to the combustion of conventional diesel fuel. However, biodiesel has different chemical properties such as greater solvent activity, higher freezing temperature, higher viscosity, and lower volatility. As a result, diesel engines may include components that are incompatible with biodiesel fuel.

BRIEF DESCRIPTION

In one embodiment, a biodiesel conversion kit for a diesel engine may include a plurality of soft fuel lines with a Teflon inner sleeve, the plurality of soft fuel lines configured to couple a fuel reservoir to a series of unitized fuel injection assemblies, a first hard fuel line including a first bend angle configured to couple to a first soft fuel line of the plurality of soft fuel lines, a second hard fuel line comprising a second bend angle configured to couple to a second soft fuel line of the plurality of soft fuel lines, and a third hard fuel line including a third bend angle configured to couple to a third soft fuel line of the plurality of soft fuel lines.

DETAILED DESCRIPTION

Figure 1:
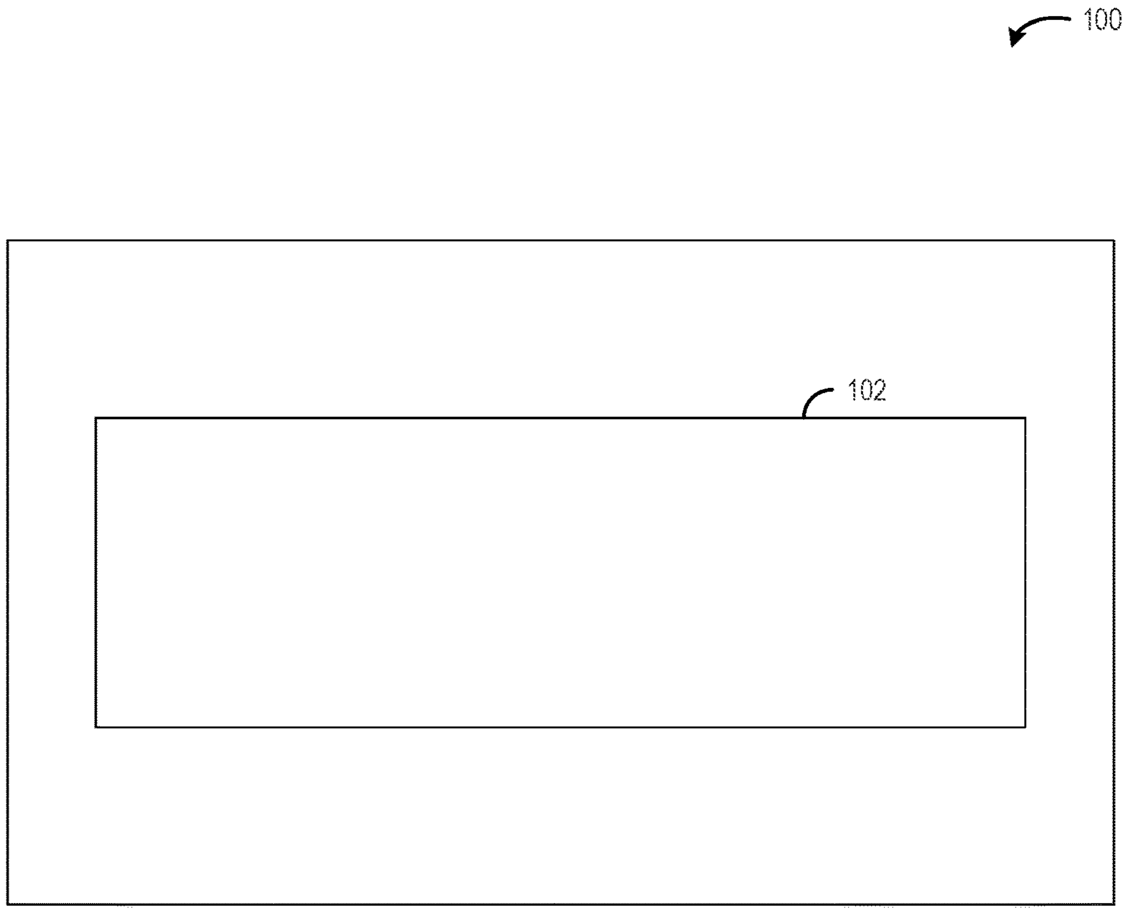
FIG. 1 shows a schematic diagram of a system with an engine, according to an embodiment of the present disclosure

Embodiments disclosed in the following description may relate to methods and systems for a biodiesel conversion kit for an internal combustion engine (ICE) such as an FDL engine. Such an engine may be positioned in a vehicle system, such as a locomotive rail vehicle, ships, and heavy-duty trucks, or paired with a generator for producing electricity. Suitable engines may include a plurality of cylinders and a low-pressure fuel system carrying fuel to the plurality of cylinders. The low-pressure fuel system may deliver the fuel to a unit pump injection system including one pump and one injector per cylinder. The low-pressure fuel system may include a plurality of soft fuel lines, including a supply fuel line and a return fuel line directly coupled to each cylinder, hard fuel lines, a fuel pump, a plurality of hoses coupling the soft and hard fuel lines to components for conditioning the fuel, e.g., thermal, water content, rock catcher, strainer, etc.

Biodiesel is a diesel fuel prepared from agricultural products such as vegetable oil and animal fat. Combusting biodiesel fuel may produce fewer emissions relative to conventional diesel fuel, e.g., petroleum-derived diesel. For example, biodiesel engines may produce lower levels of carbon dioxide and particulates. In some examples, biodiesel may have properties that make it incompatible with the diesel engine fuel systems. For example, biodiesel may degrade rubber, and other materials, which may make biodiesel fuel incompatible with fuel lines, rubber gaskets, and seals. Some metal components are degraded by biodiesel, which may make biodiesel incompatible with some valves and heat exchangers. As another example, biodiesel may have different cold-flow properties, including gelling and solidifying at higher temperatures, and different water content, which untreated may affect engine performance. Aspects of the invention may allow the internal combustion engine to operate using biodiesel fuel. A biodiesel conversion kit may include biodiesel compatible components that may replace components of the low-pressure fuel system.

A technical effect for one embodiment of a biodiesel conversion kit for an FDL engine is that the engine may operate using biodiesel fuel without degrading incompatible components or reducing performance. In one embodiment, a biodiesel conversion kit may include a plurality of soft fuel lines with a Teflon inner sleeve, which may replace biodiesel incompatible rubber hoses. For example, the soft fuel lines with the Teflon inner sleeve may replace the rubber hoses that make up the fuel supply line, the fuel return line, or the plurality of hoses that fluidly couple fuel-conditioning components of the low-pressure fuel system. The biodiesel compatible soft fuel lines are stiffer than the conventional rubber hoses, therefore the kit may also include replacement hardware that is designed to accommodate the plurality of soft fuel lines with the Teflon inner sleeve. For example, replacement hardware may include three hard fuel lines that couple the fuel reservoir to the fuel supply line and the fuel return line. The hard fuel lines included in the kit may each include an end region with a bend angle that is configured to couple to a specific soft fuel line. The kit may further include biodiesel fuel conditioning components such as a diesel heater and a water separator.

An axis system 201 is shown in FIGS. 2A-3B, and FIGS. 8A-8B for comparison between views, including three axes, namely an x-axis parallel to a lateral direction, a y-axis parallel to a longitudinal direction, and a z-axis parallel to a vertical direction. A direction of gravity may be opposite a positive direction of the z-axis.

An example of a system 100 powered by a diesel engine 102 in which the systems and methods may be implemented is shown in FIG. 1. In one example, the diesel engine may be an FDL engine. In one example, the diesel engine may power a locomotive rail vehicle. In another example, the diesel engine may power a ship. In yet another example, the diesel engine may drive a generator to produce electricity.

Figure 2A:
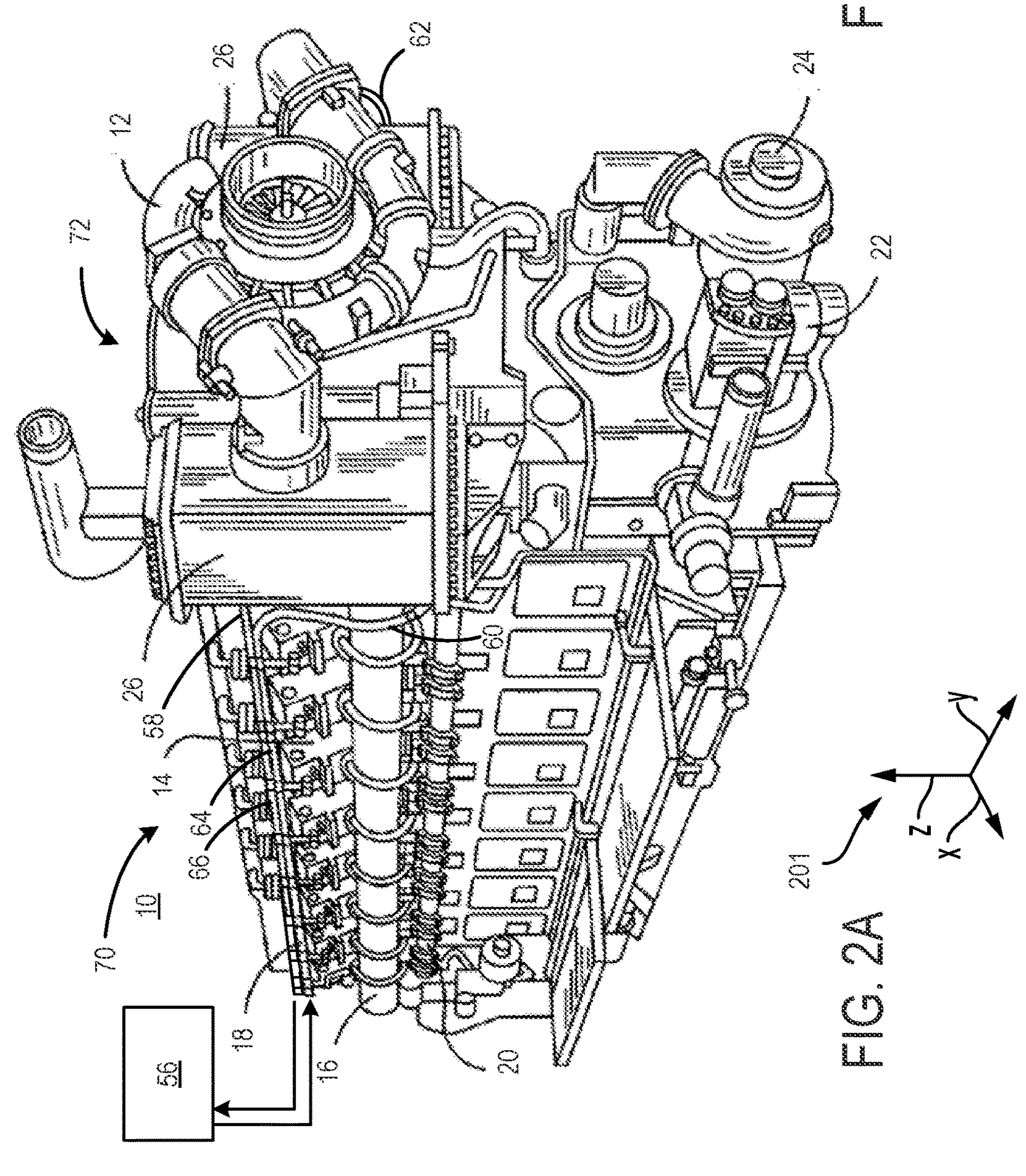
FIG. 2A shows a first view of an engine that may be included in the system of FIG. 1.
Figure 3A:
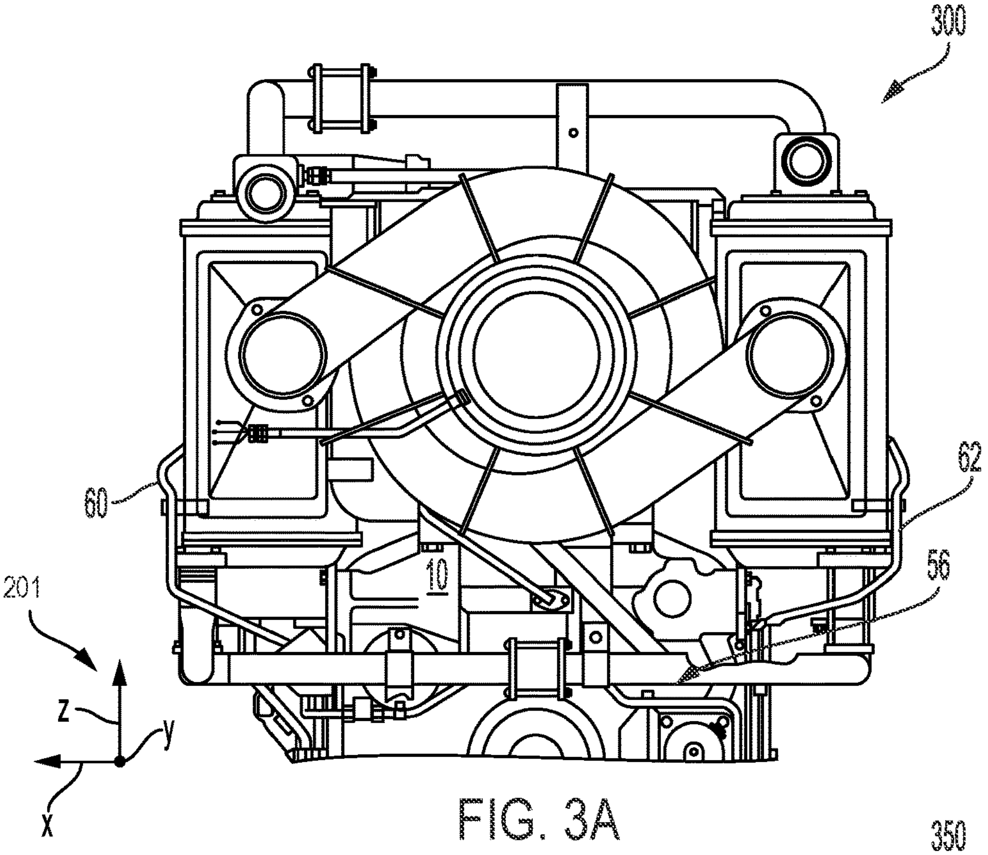
FIG. 3A shows a front view an engine that may be included in the system of FIG. 1.
Figure 3B:
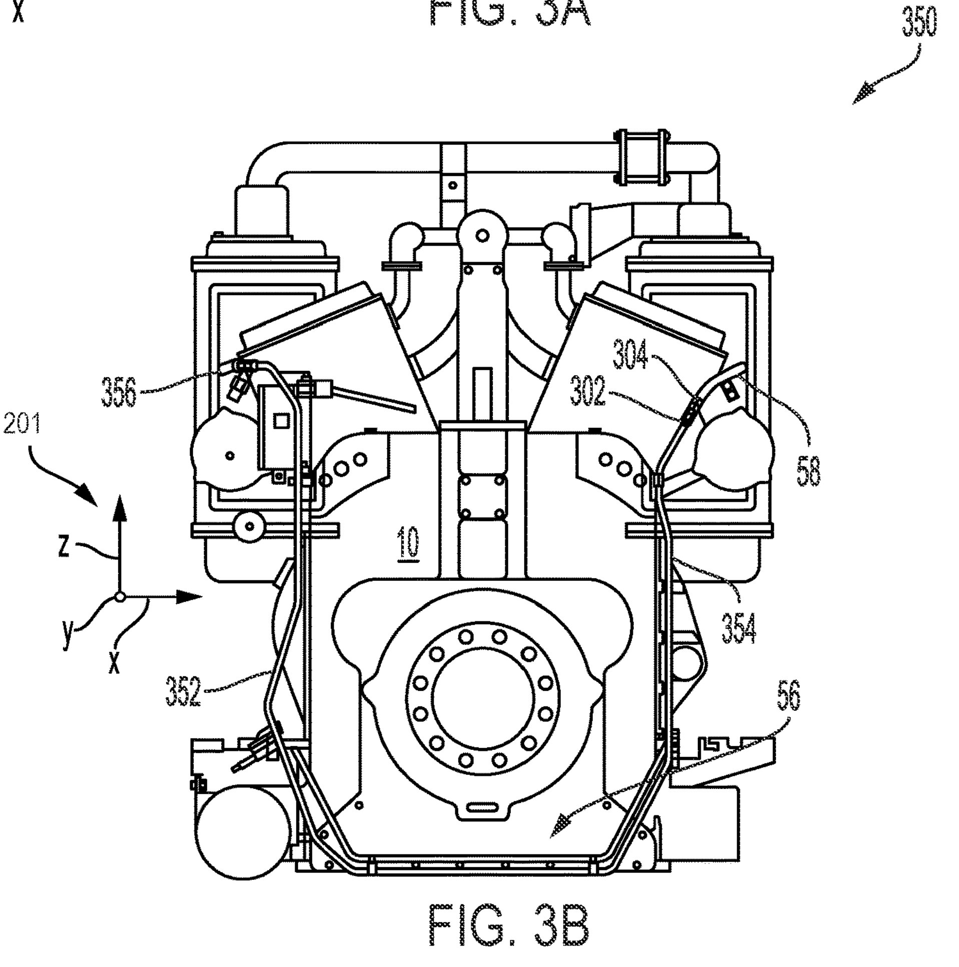
FIG. 3B shows a rear view of an engine that may be included in the system of FIG. 1.

FIG. 2A generally depicts an exemplary compression ignition diesel engine 10 for which a biofuel conversion kit is disclosed in accordance with one embodiment of the invention. The engine may be any relatively large diesel engine, such as diesel engine models FDL-12, FDL-16, or HDL, as manufactured by General Electric Company, at Grove City, Pa. Such an engine may include a turbo charger 12 and a series of unitized power or fuel injection assemblies 14. For example, a 12-cylinder engine has 12 such power assemblies while a 16-cylinder engine has 16 such power assemblies. The engine is in fluid communication with a fuel reservoir 56, shown schematically. In one example, the fuel reservoir may be located on or within the system driven by the engine, such as located in the locomotive or the ship. The engine further includes an air intake manifold 16, a first fuel supply line 18 for supplying fuel to each of the power assemblies, a first fuel return line 58 for returning fuel to the fuel reservoir, a front right hard line 60 for supplying fuel to the first fuel supply line, a water inlet manifold 20 used in cooling the engine, a lube oil pump 22, a water pump 24, all as known in the art. The first fuel supply line and the first fuel return line may include a plurality of sub-members. For example, the first fuel supply line may include a plurality of supply line segments 64 positioned between each power assembly. The first fuel return line may include a plurality of return line segments 66 between each power assembly. An intercooler 26 connected to the turbo charger facilitates cooling of the turbo charged air before it enters a respective combustion chamber inside one of the power assemblies. The fuel injection assemblies may be arranged in a first bank 70 and a second bank 72, the second bank similarly including a plurality of power assemblies, a second fuel supply line for supplying fuel to the plurality of power assemblies, a front left hard fuel line 62 for supplying fuel to the second fuel supply line, and a fuel return line for carrying fuel to the fuel reservoir. The diesel engine may include a conventional low-pressure fuel pump (not shown) configured to pressurize fuel entering the first fuel supply line and the second fuel supply line fluidly coupled to the fuel circuit. The front right hard fuel line, the front left hard fuel line, a rear left hard fuel line, and a rear right hard fuel line are shown in FIGS. 3A-B. The engine may be a V-style type or an in line type, also as known in the art.

Figure 2B:
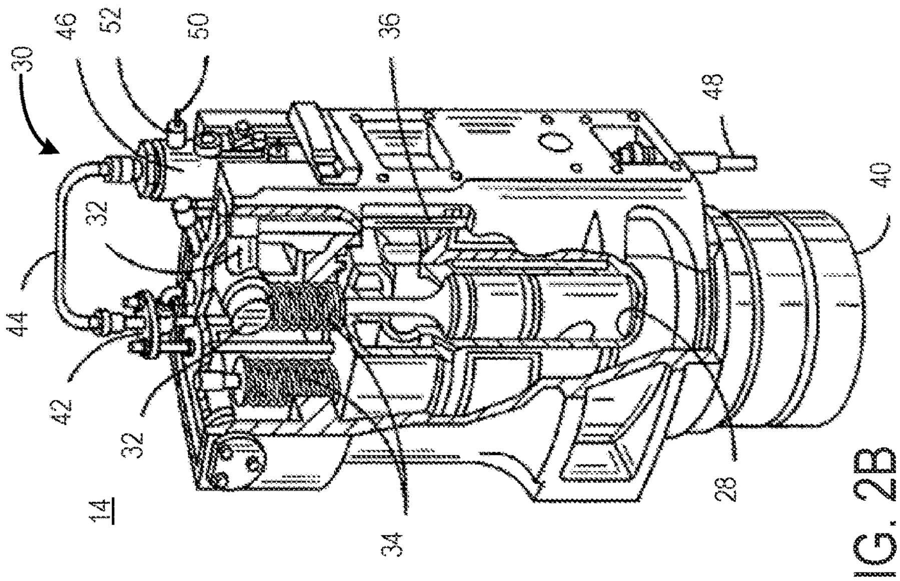
FIG. 2B shows a detail view of a unit pump injector that may be included in the engine of FIG. 2A.

FIG. 2B depicts one of the plurality of power assemblies 14 which includes a cylinder 28 and a corresponding fuel delivery assembly generally indicated at 30 for delivering fuel to the combustion chamber within the cylinder. Each unitized power assembly may further include an air valve rocker arm shaft 32 for moving a plurality of spring-biased air valves generally indicated at 34. The valve rocker arm shaft is connected to the valve pushrod 36 through the valve rocker arm, and is actuated as known in the art.

Each unitized power assembly further includes a cylinder liner 40 which is insertable into a bored aperture (not shown) in the engine block of the engine. The unitized power assembly includes a cylinder jacket or casting for housing the cylinder and associated components. For a typical engine, such as may be used in locomotive applications, an exemplary range of injection pressure is between approximately 5-30 k.p.s.i, but may be a wider range depending on the engine. An exemplary fuel delivery flow volume range is between about 50-2600 $mm^3$/stroke. An exemplary range of per cylinder displacement may be from about 1 liters to about 15 liters, or higher, depending on the engine. It will be appreciated that the present invention is not limited to the above-described exemplary ranges.

The fuel delivery assembly includes a fuel injecting mechanism 42 connected to a high-pressure injection line 44 which fluidly connects to a fuel pressure generating unit 46 such as a fuel pump. This configuration is known as a pump-line-nozzle configuration. The fuel pressure-generating unit builds pressure through the actuation of fuel pushrod 48 that is actuated by a lobe on the engine camshaft dedicated to fuel delivery actuation. The fuel delivery assembly includes an electronic signal line 50 for receiving electronic signals from an electronic controller. The electronic signal line provides a control signal to an electronically controlled valve 52, such as a solenoid, which forms part of the fuel delivery assembly. The engine depicted in FIG. 2A-B is a non-limiting embodiment of the engine.

Referring now to FIGS. 3A and 3B, a front view 300 and a rear view 350 are respectively depicted, showing portions of the diesel engine for which the biofuel conversion kit is disclosed in accordance with one embodiment of the invention. The front view shows the front left hard fuel line and the front right hard fuel line. The front left hard fuel line and the front right hard fuel line may fluidly couple the fuel reservoir to fuel supply lines, such as the first fuel supply line and the second fuel supply line introduced above. The rear end shows a rear left hard fuel line 352 and a rear right hard fuel line 354. The rear left hard fuel line may fluidly couple a second fuel return line 356 to the fuel reservoir. The rear right hard fuel line may fluidly couple the first fuel return line to the fuel reservoir. To replace a hard fuel line, such as the front left hard fuel line, the front right hard fuel line, or the rear left hard fuel line, an operator may loosen threads of a fitting 302 including a nut 304 from a socket of adjacent fuel lines, remove the hard fuel line, replace the hard fuel line, and tighten the threads of the nut and the socket.

Figure 4:
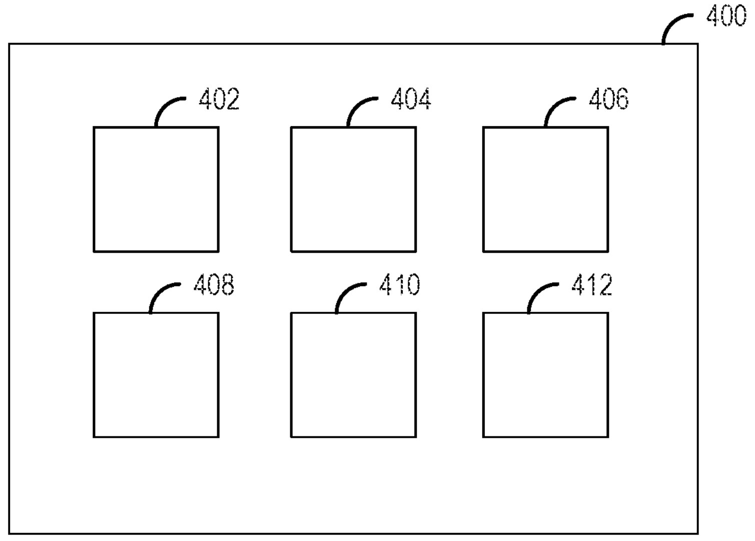
FIG. 4 shows a fuel conversion kit for an engine.

Conventionally, soft fuel lines of the fuel circuit including the fuel supply lines, the fuel return lines, and other flexible hoses carrying fuel between the fuel reservoir and the power assemblies are formed from elastomeric materials, such as rubber, reinforced rubber, AQP (acrylonitrile butadiene styrene) elastomer. Such materials are compatible with conventional diesel, and may degrade with exposure to biodiesel fuel. To operate the diesel engine with biodiesel fuel, biodiesel incompatible components may be replaced with biodiesel compatible components. FIG. 4 shows a biodiesel conversion kit 400 for a diesel engine, which may replace biodiesel incompatible components of the diesel engine.

As shown, the biodiesel conversion kit 400 may include a plurality of soft fuel lines 402 with a Teflon inner sleeve. For example, the plurality of soft fuel lines may be formed from an extruded polytetrafluorethylene (PTFE) inner tube, with a stainless steel wire reinforced exterior (e.g., braided).

Such materials are compatible with biodiesel. The plurality of soft fuel lines may be configured to couple the fuel reservoir to the series of unitized fuel injection assemblies. For example, the plurality of soft fuel lines may include a first plurality of fuel line segments configured to couple between each unitized fuel injection assembly of the series that replace biodiesel incompatible elastomeric segments. For example, the plurality of soft fuel lines may replace the elastomeric segments that make up the first fuel supply line, the second fuel supply line, the first fuel return line, and the second fuel return line.

Figures 6A, 6B, 6C:
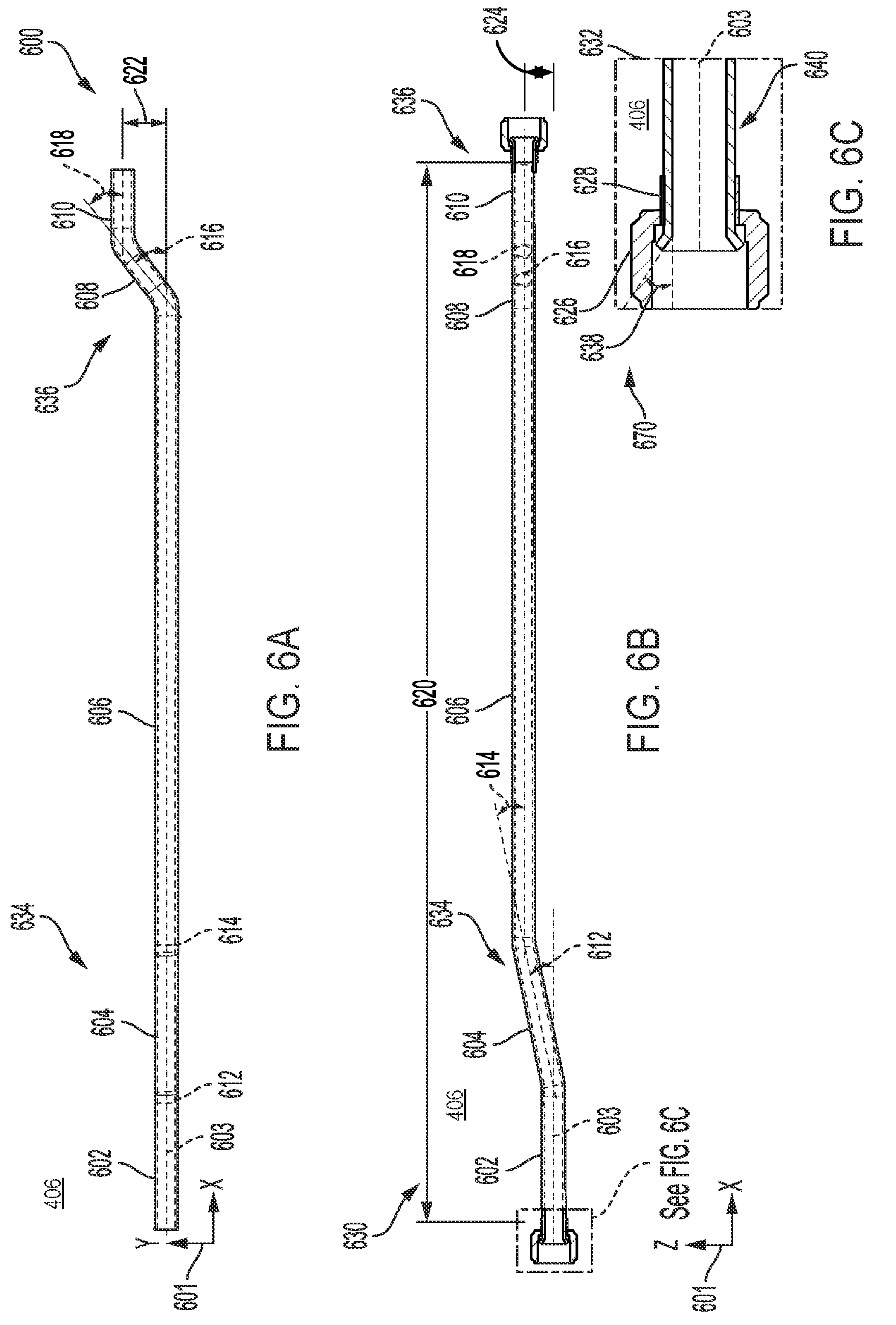
FIG. 6A shows a first view of a second hard fuel line that may be included in the fuel conversion kit of FIG. 4.
FIG. 6B shows a second view of a second hard fuel line that may be included in the fuel conversion kit of FIG. 4.
FIG. 6C shows a third view of a second hard fuel line that may be included in the fuel conversion kit of FIG. 4.

Fuel lines formed with a Teflon inner sleeve may not bend as sharply as elastomeric hoses. For example, fuel lines formed with a Teflon inner sleeve may be somewhat less flexible and include a larger bend radius than conventional elastomeric hoses. As such, hardware may be replaced to accommodate the plurality of soft fuel lines with the Teflon inner sleeve. For example, the biodiesel conversion kit may include a first hard fuel line 404, a second hard fuel line 406, and a third hard fuel line 408, each configured to accommodate the larger bend radius of the plurality of soft fuel lines with a Teflon inner sleeve. Further, the first hard fuel line, the second hard fuel line, and the third hard fuel line each have a distinct geometry, e.g., bends and straight sections, which accommodate their relative position on the diesel engine and which soft fuel line of the plurality to which they couple. For example, the first hard fuel line may replace the front right hard fuel line. The second hard fuel line may replace the front left hard fuel line. The third hard fuel line may replace the rear left hard fuel line. The first hard fuel line, the second hard fuel line, and the third hard fuel line each comprise a steel tube with flared openings, and a nut mounted over each flared opening. An example of the flared opening and nut is depicted in FIG. 6C. In some examples, the steel tube may be a seamless steel tube. In examples where the rear right hard line accommodates the larger bend radius of the soft fuel lines with the Teflon inner sleeve, a replacement hard fuel line for the rear right hard fuel line may be omitted from the biodiesel conversion kit. However, in other examples, the biodiesel replacement kit may include a fourth hard fuel line.

The biodiesel conversion kit may further include a diesel heater 410 and a water separator 412, and more soft fuel lines with a Teflon inner sleeve for coupling the diesel heater and the water separator to the fuel circuit. The diesel heater may be configured to selectively route fuel from the fuel reservoir to a heat exchanger (e.g., selectively couple and fluidly couple the diesel heater to the heat exchanger) by operating a thermostatic valve, which may mitigate incidence of gelling or solidifying sometimes associated with biodiesel. The water separator may be configured to reduce water content of fuel returning to the reservoir, which may mitigate performance issues otherwise associated with the sometimes-higher water content of biodiesel.

The biodiesel conversion kit may further include more soft fuel lines with the Teflon inner sleeve to replace rubber hoses that couple the conventional low-pressure fuel pump and strainer with the fuel circuit. For example, the plurality of soft fuel lines with the Teflon inner sleeve may include a second plurality of fuel line segments configured to couple the low-pressure fuel pump and the strainer with the fuel circuit. In some examples, biodiesel conversion of the engine may further include repositioning one or more components of the fuel circuit, such as the conventional low-pressure fuel pump and the strainer, to accommodate the biodiesel compatible and fuel conditioning components. In such examples, the fuel line segments included in the biodiesel conversion kit may be configured for the repositioned locations of the low-pressure fuel pump, the strainer, or other components of the fuel circuit.

Figures 5A, 5B, 5C:
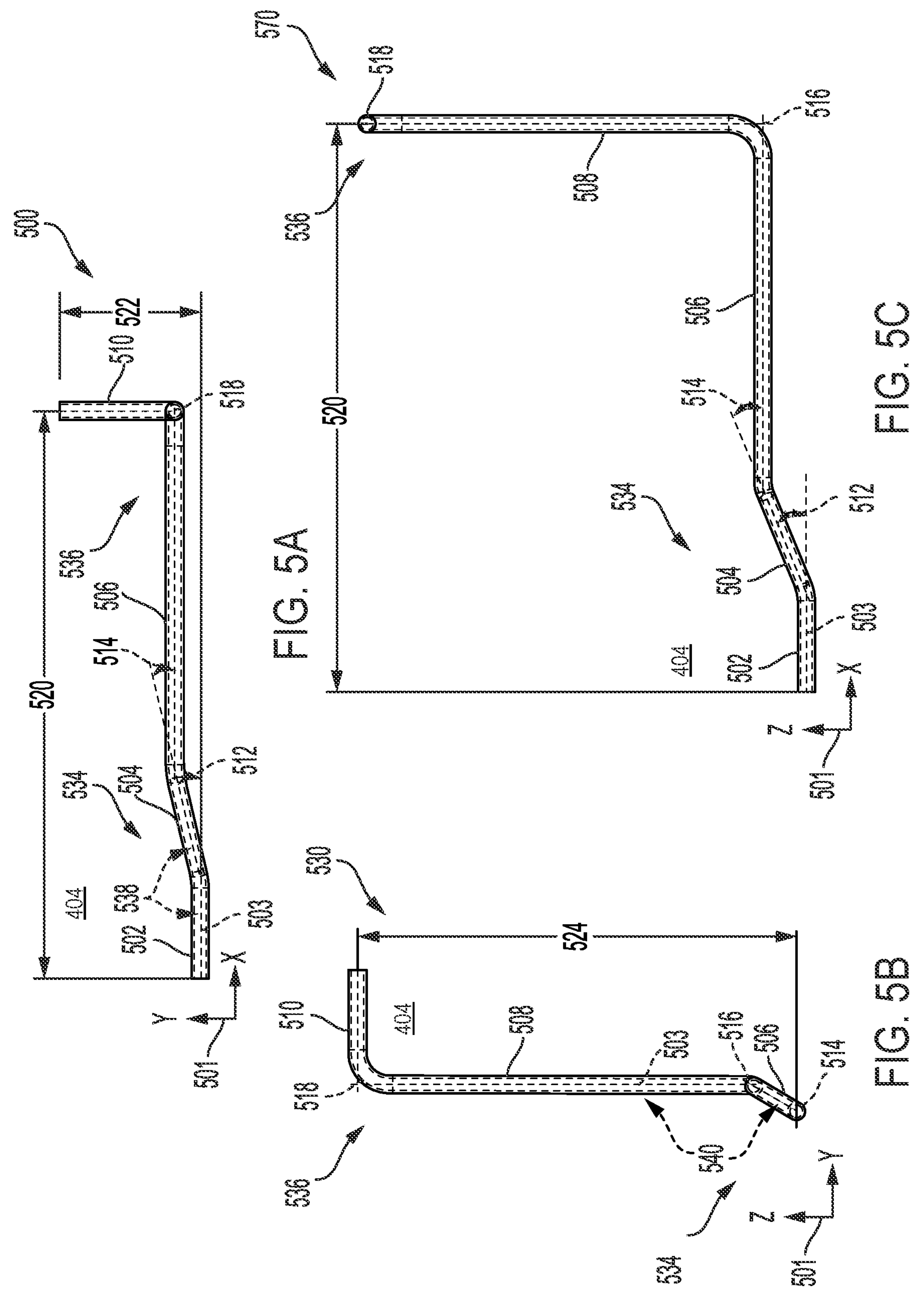
FIG. 5A shows a first view of a first hard fuel line that may be included in the fuel conversion kit of FIG. 4.
FIG. 5B shows a second view of a first hard fuel line that may be included in the fuel conversion kit of FIG. 4.
FIG. 5C shows a third view of a first hard fuel line that may be included in the fuel conversion kit of FIG. 4.

Turning to FIGS. 5A, 5B, and 5C, views 500, 530 and 570 are respectively depicted, showing a portion of the first hard fuel line that may be included in the biodiesel conversion kit. The first hard fuel line is shown without the nut which may be placed over each end of the first hard fuel line; however, it may be understood that when included in the biodiesel conversion kit, the first hard fuel line may include a nut on each end.

An axis system 501 is shown for reference. The view 500 shows the first hard fuel line viewed from an X-Y plane. The view 530 shows the first hard fuel line viewed from a Z-Y plane. The view 570 shows the first hard line viewed from a Z-X plane. A central axis 503 of the first hard fuel line is indicated with a dashed line.

The first hard fuel line includes a first end region 534 and a second end region 536. The first end region may include a first straight length 502 that is arranged at a first bend angle 512 from a second straight length 504. The second end region may include a fourth straight length 508 that is arranged at a fourth bend angle 518 from a fifth straight length 510. In one example, the first bend angle may include a first threshold range of 25°±5°. In one example, the fourth bend angle may include a second threshold range of 90°±5°. In other examples, one or both of the first threshold range and the second threshold range may be broader, narrower, higher, or lower. The first hard fuel line may include a third straight length 506, that is arranged at a bend angle 514 relative to the second straight length and at a bend angle 516 relative to the fourth straight length.

General dimensions of the first hard fuel line include length 520, height 522, and width 524. In one example, the length, height, and width may include a range of 24.73"±0.5", 6.5"±0.5", and 19"±0.5" respectively. When viewed from the X-Y plane, the first straight length and the second straight length may be arranged at an angle 538 within a threshold range of 167°±5°. When viewed from the X-Y plane, the second straight length and the fourth straight length may be arranged at an angle 540 within a threshold range of 148°±5°.

An exemplary Table 1 of coordinates for the first hard fuel line is shown below. The X, Y, and Z coordinates are given in inches. The table is a non-limiting example and other dimensions are possible.

TABLE 1

| Part | X ± 0.5" | Y ± 0.5" | Z ± 0.5" | Bend degree ± 5° |
|---|---|---|---|---|
| 502 | .00 | .00 | .00 | 0° |
| 512 | 4.30 | .00 | .00 | 25° |
| 514 | 8.87 | 1.10 | 1.10 | 25° |
| 516 | 24.73 | 1.15 | 1.90 | 90° |
| 518 | 24.73 | 1.15 | 19.14 | 90° |
| 510 | 24.73 | 6.15 | 19.14 | 0° |

Turning to FIGS. 6A, 6B, and 6C, view 600, view 630, and detail view 670 are respectively depicted, showing a portion of the second hard fuel line that may be included in the biodiesel conversion kit. The second hard fuel line is shown in view 600 without the nut which may be placed over each end of the second hard fuel line, however it may be understood that when included in the biodiesel conversion kit, the second hard fuel line may include a nut on each end.

An axis system 601 is shown for reference. The view 600 shows the second hard fuel line viewed from an X-Y plane. The view 630 shows the second hard fuel line viewed from a Z-X plane. The detail view 670 shows the second hard line viewed from the Z-X plane. A central axis 603 of the second hard fuel line is indicated with a dashed line.

The second hard fuel line includes a first end region 634 and a second end region 636. The first end region may include a first straight length 602 that is arranged at a second bend angle 612 from a second straight length 604. The second end region may include a fourth straight length 608 that is arranged at a fifth bend angle 618 from a fifth straight length 610. In one example, the second bend angle may include a third threshold range of 11°±5°. In one example, the fifth bend angle may include a fourth threshold range of 39°±5°. In other examples, one or both of the third threshold range and the fourth threshold range may be broader, narrower, higher, or lower. The second hard fuel line may include a third straight length 606 that is arranged at a bend angle 614 relative to the second straight length and a bend angle 616 relative to the fourth straight length. General dimensions of the second hard fuel line include length 620, height 622, and width 624. In one example, the length, height, and width may include a range of 34.11"±0.5", 1.41"±0.5", and 1.01"±0.5" respectively.

An exemplary Table 2 of coordinates for the second hard fuel line is shown below. The X, Y, and Z coordinates are given in inches. The table is a non-limiting example and other dimensions are possible.

TABLE 2

| Part | X ± 0.5" | Y ± 0.5" | Z ± 0.5" | Bend degree ± 5° |
|---|---|---|---|---|
| 602 | .00 | .00 | .00 | 0° |
| 612 | 4.20 | .00 | .00 | 11° |
| 614 | 8.98 | .00 | .96 | 11° |
| 616 | 29.91 | .00 | .96 | 39° |
| 618 | 31.65 | 1.41 | 1.00 | 39° |
| 610 | 34.11 | 1.41 | 1.01 | 0° |

FIG. 6C shows in detail an end 632 of the second hard fuel line, which may include a steel tube body 640, a sleeve 628 mounted over the steel tube body, and a nut 626 mounted over the sleeve. Further, the end may include a flared opening 638, the flared end angled within a threshold range of 37°±5°. In one embodiment, end portions of the first hard fuel line and the third hard fuel line may be similar to the end portion of the second hard fuel line.

Figures 7A, 7B, 7C:
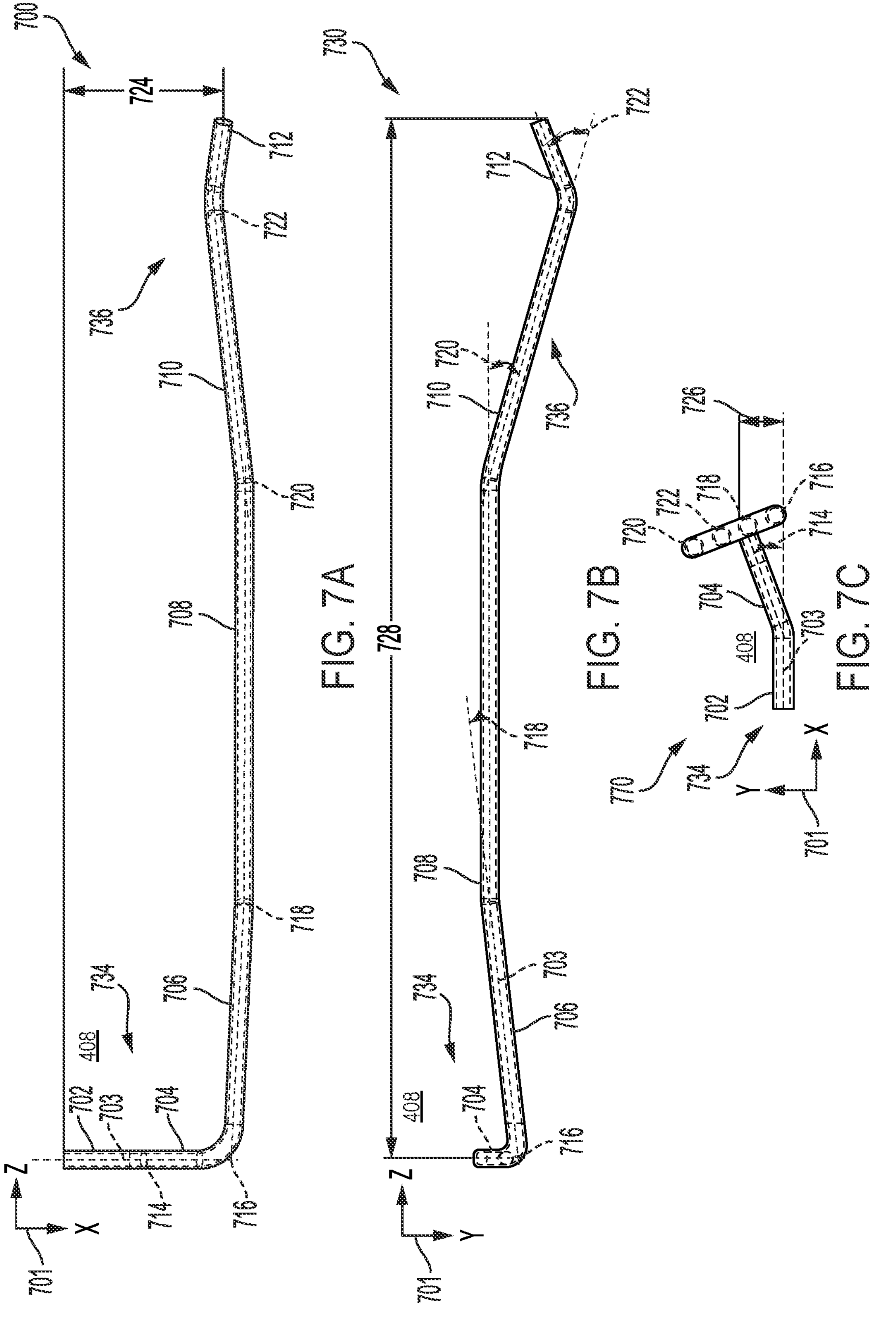
FIG. 7A shows a first view of a third hard fuel line that may be included in the fuel conversion kit of FIG. 4.
FIG. 7B shows a second view of a third hard fuel line that may be included in the fuel conversion kit of FIG. 4.
FIG. 7C shows a third view of a third hard fuel line that may be included in the fuel conversion kit of FIG. 4.

Turning to FIGS. 7A, 7B, and 7C, a view 700, a view 730, and a view 770 are respectively depicted, showing a portion of the third hard fuel line that may be included in the biodiesel conversion kit. The third hard fuel line is shown in views 700, 730, 770 without the nut that may be placed over each end of the third hard fuel line, however it may be understood that when included in the biodiesel conversion kit, the third hard fuel line may include a nut on each end.

An axis system 701 is shown for reference. The view 700 shows the third hard fuel line viewed from an X-Z plane. The view 730 shows the third hard fuel line viewed from a Z-Y plane. The detail view 770 shows the third hard line viewed from the X-Y plane. A central axis 703 of the second hard fuel line is indicated with a dashed line.

The third hard fuel line includes a first end region 734 and a second end region 736. The first end region may include a first straight length 702, a third bend angle 714, and a second straight length 704. The second end region may include a fourth straight length 710, a sixth bend angle 722, and a fifth straight length 712. In one example, the third bend angle may include a fifth threshold range of 21°±5°. In one example, the sixth bend angle may include a sixth threshold range of 39°±5°. In other examples, one or both of the fifth threshold range and the sixth threshold range may be broader, narrower, higher, or lower. The third hard fuel line may include a third straight length 706 and a sixth straight length 708. In some examples, the third straight length may be arranged at a bend angle 716 from the second straight length, and arranged at a bend angle 718 from the sixth straight length. The sixth straight length may be arranged at a bend angle 720 from the fourth straight length. General dimensions of the third hard fuel line include a length 724, a height 726, and a width 728. In one example, the length, height, and width may include threshold ranges of 6.66"±0.5", 2.39"±0.5", and 43.41"±0.5" respectively.

An exemplary Table 3 of coordinates for the third hard fuel line is shown below. The X, Y, and Z coordinates are given in inches. The table is a non-limiting example and other dimensions are possible.

TABLE 3

| Part | X ± 0.5" | Y ± 0.5" | Z ± 0.5" | Bend degree ± 5° |
|---|---|---|---|---|
| 702 | .00 | .00 | .00 | 0° |
| 714 | 3.05 | .00 | .00 | 21° |
| 716 | 7.05 | 1.54 | .00 | 90° |
| 718 | 7.52 | .31 | 10.79 | 7° |
| 720 | 7.55 | .27 | 28.19 | 17° |
| 722 | 6.25 | 3.65 | 40.12 | 39° |
| 712 | 6.66 | 2.39 | 43.41 | 0° |

Figure 8A:
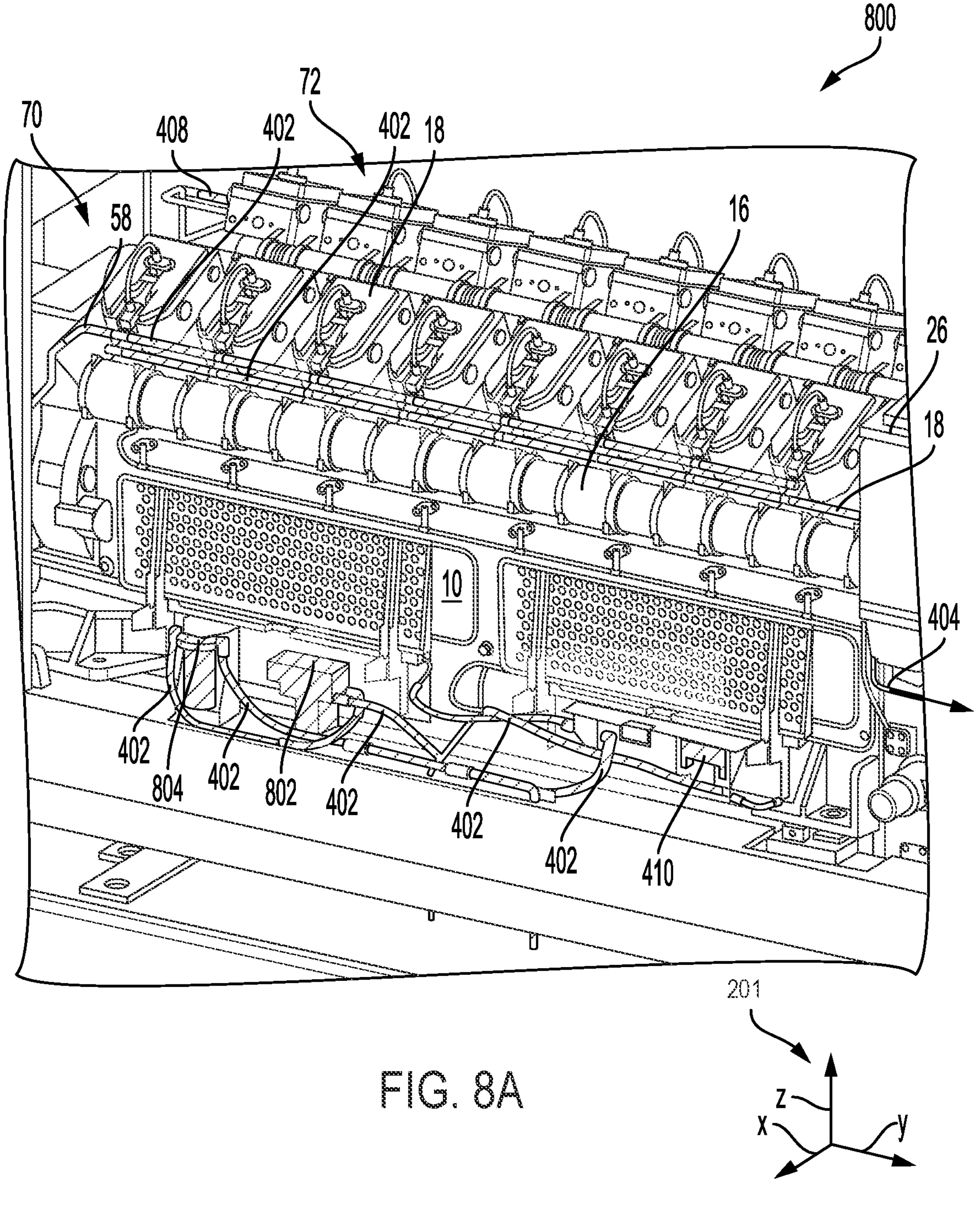
FIG. 8A shows a first view of a diesel engine including a biodiesel compatible fuel circuit.
Figure 8B:
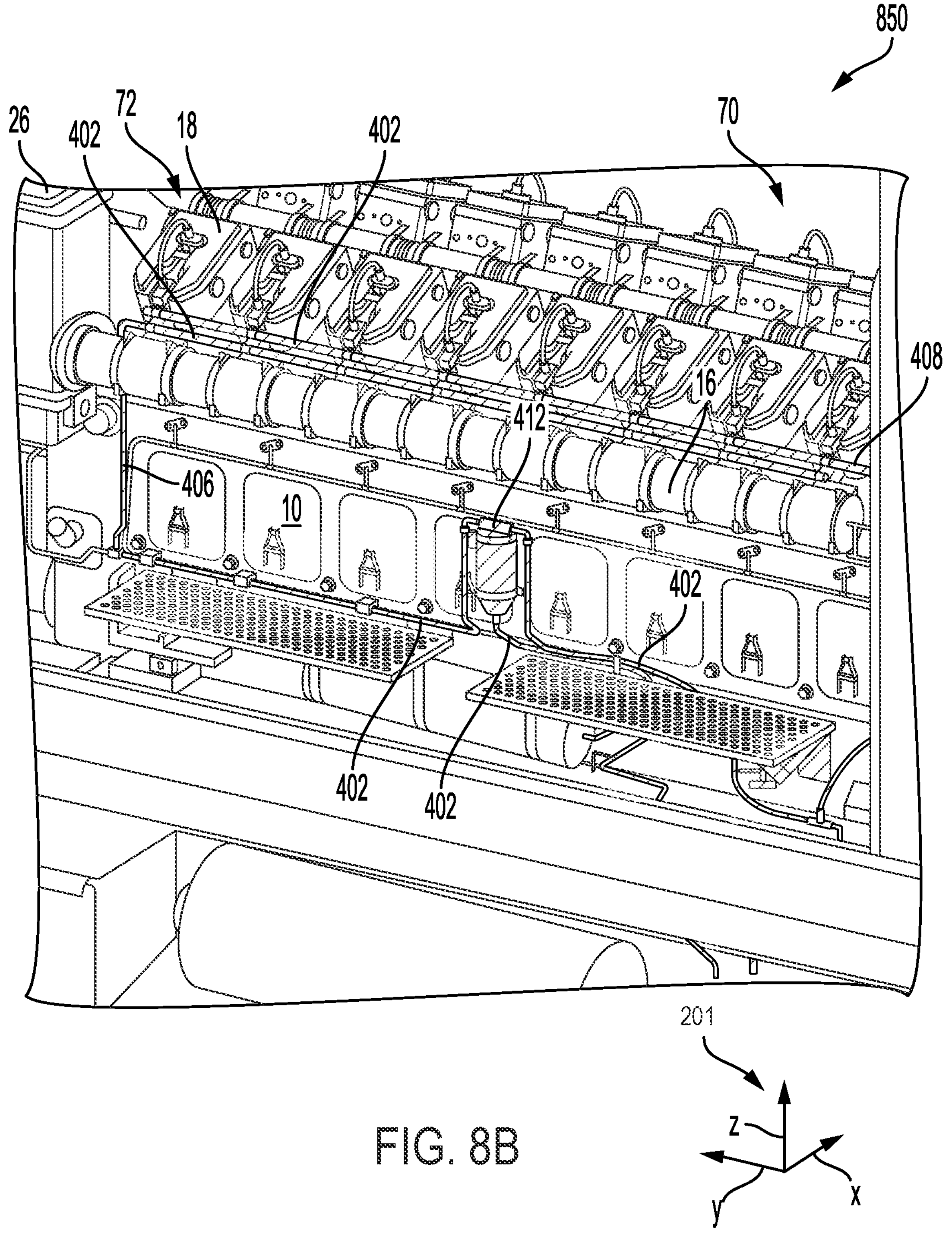
FIG. 8B shows a second view of a diesel engine including the biodiesel compatible fuel circuit.

Turning to FIGS. 8A-8B, the diesel engine is shown. In one example, a method for the diesel engine may include operating the diesel engine with conventional fuel, such as petroleum-derived diesel, replacing biodiesel incompatible components of the fuel circuit, and operating the diesel engine with biodiesel. FIGS. 8A-8B show the diesel engine including a biodiesel compatible fuel circuit 800, 850 (indicated by an oblique line fill), respectively, connecting the series of unitized fuel injection assemblies to the fuel reservoir. In the figures, biodiesel incompatible components are replaced by biodiesel compatible components provided in the disclosed biodiesel conversion kit. For example, the biodiesel compatible fuel circuit may include the plurality of soft fuel lines comprising the Teflon inner sleeve, the first hard fuel line, the second hard fuel line, or the third hard fuel line.

Turning to FIG. 8A, converting the diesel engine to use biodiesel may include replacing the plurality of biodiesel incompatible elastomeric hoses of the fuel circuit with one or more of the plurality of biodiesel compatible soft fuel lines, e.g., with the inner Teflon sleeve. For example, the supply line segments that make up the first fuel supply line and return line segments that make up the first fuel return line may be replaced with biodiesel compatible soft fuel lines. Further, the first hard fuel line may replace the right front right hard fuel line.

As another example, converting the diesel engine to use biodiesel may include coupling the diesel heater to the biodiesel compatible fuel circuit via more of the plurality of biodiesel compatible soft fuel lines. Biodiesel conversion of the engine may include replacing elastomeric hoses coupling a biodiesel compatible low-pressure fuel pump 802 and strainer 804 to the fuel circuit. For example, the existing conventional low-pressure fuel pump and strainer may be biodiesel compatible. In such examples, biodiesel conversion includes retaining the existing conventional low-pressure fuel pump and strainer and replacing the biodiesel incompatible hoses with more of the plurality of biodiesel compatible soft fuel lines, e.g., the second plurality of fuel line segments.

Turning to FIG. 8B, supply line segments that make up the second fuel supply line and return line segments that make up the second fuel return line may be replaced with biodiesel compatible soft fuel lines. Further, the second hard fuel line may replace the left front right hard fuel line. The third hard fuel line may replace the left rear hard line. The diesel engine may further include the water separator coupled to the biodiesel compatible fuel circuit via more of the plurality of biodiesel compatible soft fuel lines. Configured as shown, the diesel engine may operate using biodiesel fuel.

A biodiesel conversion kit for an FDL engine may be provided including a plurality of soft fuel lines with a Teflon inner sleeve, the plurality of soft fuel lines configured to couple a fuel reservoir to a series of unitized fuel injection assemblies, and a plurality of hard fuel lines which include geometry to accommodate the plurality of soft fuel lines with the Teflon inner sleeve. The biodiesel kit may further include components that condition biodiesel fuel, such as a diesel heater for reducing incidence of gelling and freezing, and water separator for mitigating issues related to the sometimes-higher water content of biodiesel fuel. By providing biodiesel compatible components to replace biodiesel incompatible components, the technical effect for one embodiment of a biodiesel conversion kit for an FDL engine is that the engine may operate using biodiesel fuel without degrading incompatible components or negatively impacting performance.

The disclosure also provides support for a biodiesel conversion kit for a diesel engine, comprising: a plurality of soft fuel lines with a Teflon inner sleeve, the plurality of soft fuel lines configured to couple a fuel reservoir to a series of unitized fuel injection assemblies, a first hard fuel line comprising a first bend angle configured to couple to a first soft fuel line of the plurality of soft fuel lines, a second hard fuel line comprising a second bend angle configured to couple to a second soft fuel line of the plurality of soft fuel lines, and a third hard fuel line comprising a third bend angle configured to couple to a third soft fuel line of the plurality of soft fuel lines. In a first example of the system, the plurality of soft fuel lines with the Teflon inner sleeve comprise a fuel supply line and a fuel return line, the fuel supply line and the fuel return line comprising a first plurality of fuel line segments configured to couple between each unitized fuel injection assembly of the series. In a second example of the system, optionally including the first example, the first hard fuel line, the second hard fuel line, and the third hard fuel line each comprise a steel tube with flared openings, and a nut mounted over each flared opening. In a third example of the system, optionally including one or both of the first and second examples, the first hard fuel line comprises a first end region and an second end region, the first end region comprising a first straight length arranged at the first bend angle from a second straight length, and the second end region comprising a fourth straight length arranged at a fourth bend angle from a fifth straight length, wherein the first bend angle comprises a first threshold range of 25°±5° and the fourth bend angle comprises a second threshold range of 90°±5°. In a fourth example of the system, optionally including one or more or each of the first through third examples, the second hard fuel line comprises a first end region and an second end region, the first end region comprising a first straight length arranged at the second bend angle from a second straight length, and a fourth straight length arranged at a fifth bend angle from a fifth straight length, wherein the second bend angle comprises a third threshold range of 11°±5° and the fifth bend angle comprises a fourth threshold range of 39°±5°. In a fifth example of the system, optionally including one or more or each of the first through fourth examples, the third hard fuel line comprises a first end region and an second end region, the first end region comprising a first straight length arranged at the third bend angle from a second straight length, and the second end region comprising a fifth straight length arranged at a sixth bend angle from a sixth straight length, wherein the third bend angle comprises a fifth threshold range of 21°±5° and the sixth bend angle comprises a sixth threshold range of 39°±5°. In a sixth example of the system, optionally including one or more or each of the first through fifth examples, the system further comprises: a water separator configured to fluidly couple the fuel reservoir to a fuel supply line. In a seventh example of the system, optionally including one or more or each of the first through sixth examples, the system further comprises: a diesel heater configured to selectively couple a fuel supply line to the diesel heater by operating a thermostatic valve. In an eighth example of the system, optionally including one or more or each of the first through seventh examples, the plurality of soft fuel lines further comprise a second plurality of fuel line segments, the second plurality of fuel line segments configured to couple a low-pressure fuel pump and a strainer with the fuel reservoir. In a ninth example of the system, optionally including one or more or each of the first through eighth examples, the plurality of soft fuel lines further comprise a stainless steel wire reinforced exterior.

The disclosure also provides support for a method for a diesel engine, comprising: operating the diesel engine with conventional fuel, replacing biodiesel incompatible components of a fuel circuit with biodiesel compatible components, and operating the diesel engine with biodiesel fuel, wherein the biodiesel compatible components comprise a plurality of soft fuel lines with a Teflon inner sleeve, the plurality of soft fuel lines configured to fluidly couple a fuel reservoir to a series of unitized fuel injection assemblies, a first hard fuel line comprising a first bend angle configured to couple to a first soft fuel line of the plurality of soft fuel lines, a second hard fuel line comprising a second bend angle configured to couple to a second soft fuel line of the plurality of soft fuel lines, or a third hard fuel line comprising a third bend angle configured to couple to a third soft fuel line of the plurality of soft fuel lines. In a first example of the method, the plurality of soft fuel lines comprise a fuel supply line and a fuel return line, the fuel supply line and the fuel return line comprising a first plurality of fuel line segments configured to couple between each unitized fuel injection assembly of the series. In a second example of the method, optionally including the first example the plurality of soft fuel lines replacing a plurality of biodiesel incompatible elastomeric hoses of the fuel circuit. In a third example of the method, optionally including one or both of the first and second examples, the method further comprises fluidly coupling a water separator and a diesel heater to the fuel circuit. In a fourth example of the method, optionally including one or more or each of the first through third examples, the plurality of soft fuel lines comprise a second plurality of fuel line segments configured to couple a low-pressure fuel pump and a strainer with the fuel reservoir. In a fifth example of the method, optionally including one or more or each of the first through fourth examples, the first hard fuel line, the second hard fuel line, and the third hard fuel line each comprise a steel tube with flared openings, and a nut mounted over each flared opening.

The disclosure also provides support for a system comprising: a diesel engine comprising a biodiesel compatible fuel circuit connecting a series of unitized fuel injection assemblies to a fuel reservoir, the biodiesel compatible fuel circuit comprising: a plurality of soft fuel lines comprising a Teflon inner sleeve, a first hard fuel line comprising a first bend angle, the first hard fuel line coupling the fuel reservoir to a first fuel supply line of the plurality of soft fuel lines, a second hard fuel line comprising a second bend angle, the second hard fuel line coupling a second fuel supply line of the plurality of soft fuel lines to the fuel reservoir, and a third hard fuel line comprising a third bend angle, the third hard fuel line coupling a first fuel return line of the plurality of soft fuel lines to the fuel reservoir. In a first example of the system, the first fuel supply line and the first fuel return line fluidly couple a first bank of the series of unitized fuel injection assemblies to the fuel reservoir, and the second fuel supply line and a second fuel return line fluidly couple a second bank of the series of unitized fuel injection assemblies to the fuel reservoir. In a second example of the system, optionally including the first example, the system further comprises: a biodiesel compatible low-pressure pump fluidly coupling the fuel reservoir to the first fuel supply line and the second fuel supply line, the biodiesel compatible low-pressure pump configured to pressurize fuel entering the first fuel supply line and the second fuel supply line. In a third example of the system, optionally including one or both of the first and second examples, the system further comprises: a diesel heater fluidly coupled to the biodiesel compatible fuel circuit, the diesel heater selectively coupling the fuel reservoir to a heat exchanger by operating a thermostatic valve.

As used herein, an element or step recited in the singular and preceded with the word "a" or "an" do not exclude plural of said elements or steps, unless such exclusion is indicated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

As used herein, the term "approximately" is means plus or minus five percent of a given value or range unless otherwise indicated. This written description uses examples to disclose the invention, including the best mode, and also to enable a person of ordinary skill in the relevant art to practice the invention, including making and using devices or systems and performing the incorporated methods. The patentable scope of the invention is defined by the claims, and may include other embodiments that occur to those of ordinary skill in the art. Such other embodiments are intended to be within the scope of the claims if they have structural elements that do not differ from the literal language of the claims, or if they include equivalent structural elements with insubstantial differences from the literal languages of the claims.

The invention claimed is:

1. A biodiesel conversion kit for a diesel engine, comprising:

a plurality of soft fuel lines with a Teflon inner sleeve, the plurality of soft fuel lines configured to couple a fuel reservoir to a series of unitized fuel injection assemblies;

a first hard fuel line comprising a first bend angle configured to couple to a first soft fuel line of the plurality of soft fuel lines;

a second hard fuel line comprising a second bend angle configured to couple to a second soft fuel line of the plurality of soft fuel lines; and a third hard fuel line comprising a third bend angle configured to couple to a third soft fuel line of the plurality of soft fuel lines.

2. The biodiesel conversion kit of claim 1, wherein the plurality of soft fuel lines with the Teflon inner sleeve comprise a fuel supply line and a fuel return line, the fuel supply line and the fuel return line comprising a first plurality of fuel line segments configured to couple between each unitized fuel injection assembly of the series.

3. The biodiesel conversion kit of claim 1, wherein the first hard fuel line, the second hard fuel line, and the third hard fuel line each comprise a steel tube with flared openings, and a nut mounted over each flared opening.

4. The biodiesel conversion kit of claim 1, wherein the first hard fuel line comprises a first end region and an second end region, the first end region comprising a first straight length arranged at the first bend angle from a second straight length, and the second end region comprising a fourth straight length arranged at a fourth bend angle from a fifth straight length, wherein the first bend angle comprises a first threshold range of 25°±5° and the fourth bend angle comprises a second threshold range of 90°±5°.

5. The biodiesel conversion kit of claim 4, wherein the second hard fuel line comprises a first end region and an second end region, the first end region comprising a first straight length arranged at the second bend angle from a second straight length, and a fourth straight length arranged at a fifth bend angle from a fifth straight length, wherein the second bend angle comprises a third threshold range of 11°±5° and the fifth bend angle comprises a fourth threshold range of 39°±5°.

6. The biodiesel conversion kit of claim 5, wherein the third hard fuel line comprises a first end region and an second end region, the first end region comprising a first straight length arranged at the third bend angle from a second straight length, and the second end region comprising a fifth straight length arranged at a sixth bend angle from a sixth straight length, wherein the third bend angle comprises a fifth threshold range of 21°±5° and the sixth bend angle comprises a sixth threshold range of 39°±5°.

7. The biodiesel conversion kit of claim 1, further comprising a water separator configured to fluidly couple the fuel reservoir to a fuel supply line.

8. The biodiesel conversion kit of claim 1, further comprising a diesel heater configured to selectively couple a fuel supply line to the diesel heater by operating a thermostatic valve.

9. The biodiesel conversion kit of claim 1, wherein the plurality of soft fuel lines further comprise a second plurality of fuel line segments, the second plurality of fuel line segments configured to couple a low-pressure fuel pump and a strainer with the fuel reservoir.

10. The biodiesel conversion kit of claim 1, wherein the plurality of soft fuel lines further comprise a stainless steel wire reinforced exterior.

11. A method for a diesel engine, comprising:
operating the diesel engine with conventional fuel;
replacing biodiesel incompatible components of a fuel circuit with biodiesel compatible components; and
operating the diesel engine with biodiesel fuel,
wherein the biodiesel compatible components comprise a plurality of soft fuel lines with a Teflon inner sleeve, the plurality of soft fuel lines configured to fluidly couple a fuel reservoir to a series of unitized fuel injection assemblies;
a first hard fuel line comprising a first bend angle configured to couple to a first soft fuel line of the plurality of soft fuel lines;
a second hard fuel line comprising a second bend angle configured to couple to a second soft fuel line of the plurality of soft fuel lines; or
a third hard fuel line comprising a third bend angle configured to couple to a third soft fuel line of the plurality of soft fuel lines.

12. The method of claim 11, wherein the plurality of soft fuel lines comprise a fuel supply line and a fuel return line, the fuel supply line and the fuel return line comprising a first plurality of fuel line segments configured to couple between each unitized fuel injection assembly of the series.

13. The method of claim 12, wherein the plurality of soft fuel lines comprise a second plurality of fuel line segments configured to couple a low-pressure fuel pump and a strainer with the fuel reservoir.

14. The method of claim 11, the plurality of soft fuel lines replacing a plurality of biodiesel incompatible elastomeric hoses of the fuel circuit.

15. The method of claim 11, further comprising fluidly coupling a water separator and a diesel heater to the fuel circuit.

16. The method of claim 11, wherein the first hard fuel line, the second hard fuel line, and the third hard fuel line each comprise a steel tube with flared openings, and a nut mounted over each flared opening.

17. A system comprising:
a diesel engine comprising a biodiesel compatible fuel circuit connecting a series of unitized fuel injection assemblies to a fuel reservoir, the biodiesel compatible fuel circuit comprising:
a plurality of soft fuel lines comprising a Teflon inner sleeve;
a first hard fuel line comprising a first bend angle, the first hard fuel line coupling the fuel reservoir to a first fuel supply line of the plurality of soft fuel lines;
a second hard fuel line comprising a second bend angle, the second hard fuel line coupling a second fuel supply line of the plurality of soft fuel lines to the fuel reservoir; and
a third hard fuel line comprising a third bend angle, the third hard fuel line coupling a first fuel return line of the plurality of soft fuel lines to the fuel reservoir.

18. The system of claim 17, wherein the first fuel supply line and the first fuel return line fluidly couple a first bank of the series of unitized fuel injection assemblies to the fuel reservoir, and the second fuel supply line and a second fuel return line fluidly couple a second bank of the series of unitized fuel injection assemblies to the fuel reservoir.

19. The system of claim 17, further comprising a biodiesel compatible low-pressure fuel pump fluidly coupling the fuel reservoir to the first fuel supply line and the second fuel supply line, the biodiesel compatible low-pressure fuel pump configured to pressurize fuel entering the first fuel supply line and the second fuel supply line.

20. The system of claim 17, further comprising a diesel heater fluidly coupled to the biodiesel compatible fuel circuit, the diesel heater selectively coupling the fuel reservoir to a heat exchanger by operating a thermostatic valve.

* * * * *